United States Patent [19]
Mallie

[11] Patent Number: 5,365,556
[45] Date of Patent: Nov. 15, 1994

[54] FUEL STORAGE RACKS FOR FUEL STORAGE POOL

[75] Inventor: Frank J. Mallie, San Jose, Calif.

[73] Assignee: General Electric Company, San Jose, Calif.

[21] Appl. No.: 87,310

[22] Filed: Jul. 7, 1993

[51] Int. Cl.$^5$ .............................................. G21C 19/06
[52] U.S. Cl. .................................... 376/272; 220/264; 220/676
[58] Field of Search ...................... 376/272; 250/506.1, 250/507.1; 220/264, 326, 661, 676

[56] References Cited

U.S. PATENT DOCUMENTS

| | | | |
|---|---|---|---|
| 3,663,817 | 5/1972 | Sayers | 376/272 |
| 4,161,079 | 7/1979 | Hill | 43/58 |
| 4,216,606 | 8/1980 | Kaiser et al. | 43/83 |
| 4,299,659 | 11/1981 | Hame et al. | 376/272 |
| 5,019,327 | 5/1991 | Fanning et al. | 376/268 |
| 5,084,231 | 1/1992 | Dixon et al. | 376/271 |

Primary Examiner—Daniel D. Wasil
Attorney, Agent, or Firm—John S. Buelick

[57] ABSTRACT

A rack structure for storing channeled new fuel that awaiting a refueling operation in a nuclear reactor. The racks are designed to be floor mounted in a shallow fuel storage pool. Each rack comprises a pair of rows of fuel storage cells arranged back to back. The new fuel is loaded into the rack using a hoist, one fuel bundle being placed in each fuel storage cell. Each fuel storage cell has a latch which is mechanically linked to a contact plate at the bottom of the fuel storage cell. Each fuel bundle is latched in the fuel storage cell when the weight of the fuel bundle deflects the contact plate downward. Each fuel storage cell comprises an inclined channel which stores the fuel bundle assembly in an inclined position. The latch opens under the force of gravity in response to the fuel bundle assembly being lifted.

18 Claims, 6 Drawing Sheets

FUEL STORAGE RACKS FOR FUEL STORAGE POOL

FIELD OF THE INVENTION

This invention generally relates to the refueling of a nuclear reactor by the installation of fuel bundle assemblies. In particular, the invention relates to apparatus for storing nuclear fuel bundle assemblies before the fuel bundle assemblies are installed in the core of a nuclear reactor.

BACKGROUND OF THE INVENTION

Large-capacity power-generating nuclear fission reactor plants normally have several hundred sealed tubular containers for housing fissionable fuel. To facilitate periodic refueling, which commonly is performed by replacing fractional portions of the total fuel at intervals and rearranging other fractional portions, these fuel rods or pins are conventionally assembled into bundles or groups of elements which can be manipulated as a single composite unit.

The fuel rods of each bundle are held mutually parallel and spaced apart by mechanical means. A typical fuel bundle comprises, for example, an $8 \times 8$ or $9 \times 9$ array of spaced fuel rods. Each fuel rod is usually more than 10 ft. long, e.g., 14 ft., and approximately ½ inch in diameter.

To inhibit the fuel rods from bowing and vibrating due to high heat and high velocity of the coolant flowing past, the fuel rods are maintained in their spaced-apart relation by a plurality of spacers positioned at intervals along their length. Typical spacers for fuel rods comprise a lattice having a plurality of openings arranged in the designated pattern for spacing the parallel aligned fuel rods. The assembled bundle of a group of spaced-apart, parallel aligned fuel rods additionally each have their ends supported in corresponding sockets of upper and lower tie plates.

The typical fuel bundle assembly also comprises an open-ended tubular channel of suitable cross section, such as square, which surrounds the fuel rods. The fuel channel directs the flow of coolant longitudinally along the surface of the fuel rods and channels the neutron-absorbing fission control rods, which reciprocate longitudinally intermediate a $2 \times 2$ array of channeled fuel bundle assemblies.

A bail is connected to the upper tie plate. When a hoist is coupled to the bail, the fuel bundle assembly can be lifted and transported as a unit. When supported by a hoist, the fuel bundle assembly hangs in a generally vertical position.

A conventional new fuel storage pool has a rack comprising a plurality of cells for receiving and storing new fuel bundle assemblies. To store a new fuel bundle assembly in a cell of a conventional rack, the new fuel bundle assembly must be hoisted over the open top of the cell and then lowered into the cell. Each cell has a generally square cross section and is vertically disposed so that the fuel bundle stored therein will be held in a generally upright position as it bears against the walls of the cell.

The foregoing conventional means for storing fuel bundle assemblies in a new fuel storage pool has several disadvantages. First, it is undesirable from a safety standpoint to transport fuel along a path overlying stored fuel. In the event that the fuel bundle being transported were to break away from the hoist, the fuel would fall on top of any fuel stored below, thereby increasing the attendant hazards and complicating the clean-up operation. Second, if fuel bundle assemblies having a height h must be transported over stored fuel bundle assemblies of height h, then the new fuel storage pool must have a depth equal to at least 2h to ensure that the fuel bundle assemblies are entirely submerged in water during transport. The greater the depth of the new fuel storage pool, the greater are the attendant construction costs.

SUMMARY OF THE INVENTION

The present invention is an improved system for storing fuel bundles in a new fuel storage pool which overcomes the disadvantages of the conventional system. In particular, an array of storage racks are mounted on the floor of the new fuel storage pool. Adjacent storage racks are separated by aisles. Because fuel should not pass over stored fuel, administration control requires that the fuel be transported down the center of the pool and then down an aisle between racks.

With the fuel approximately one-half meter above the floor, a hoist moves the fuel into a storage position and starts to lower the fuel into a storage slot, hereinafter referred to as a "fuel storage cell". Lowering of the fuel to the bottom of the fuel storage cell activates a locking mechanism which holds the fuel bundle assembly in place. A flag on the locking mechanism is visible from the refueling bridge to indicate that the particular storage position is locked.

After the refueling machine has transported the spent fuel into the fuel transfer area, the refueling machine is operated to pick up new fuel. Moving down the aisle between the racks, the refueling machine grapples a new fuel bundle assembly and starts to lift it. This lifting operation actuates the locking mechanism to open, allowing the fuel to be lifted out of the fuel storage cell and then transported to the reactor cavity.

Because of a lack of depth in the new fuel storage pool, the refueling machine has insufficient mast movement to carry a fuel bundle assembly over a stored fuel bundle assembly. The invention solves this problem by providing side-loaded racks and aisles for the movement of fuel.

During a seismic event, fuel would have a tendency to fall out of side-open racks. To maintain a high level of safety during loading, the fuel remains grappled until it is secured in the fuel storage cell and then the fuel is ungrappled. During removal of the fuel bundle assembly, the fuel storage cell remains locked until the fuel is grappled and lifted.

A storage rack in accordance with the invention can also be designed to temporarily store fuel control rods. The control rod racks are shorter and wider than the fuel bundle racks. The individual storage position is larger, but the locking mechanism function is the same. Both fuel bundle assemblies and fuel control rods must be stored so that they are accessible with standard equipment.

In accordance with the preferred embodiment of the invention, each storage rack comprises a pair of rows of inclined fuel storage cells arrayed back to back. Each fuel storage cell comprises an aluminum storage channel having an open side facing the adjoining aisle to enable the fuel bundle assembly to be side-loaded. Each fuel storage cell stores a new fuel bundle assembly in an inclined position so that a gravitational force component tends to hold the fuel bundle assembly in the storage channel.

The fuel storage cell is provided at the bottom with a contact plate having an undeflected position when the fuel storage cell is unloaded and a deflected position when the fuel storage cell is loaded. The contact plate is actuated by the weight of a fuel bundle assembly. The contact plate is mechanically linked to a latching mechanism arranged at the top of the storage channel. When the contact plate is undeflected, the latching mechanism is in an open position for allowing a fuel bundle assembly to pass through during either loading or unloading. When the contact plate is deflected, the latching mechanism is closed to retain the stored fuel bundle assembly in the fuel storage cell during storage. As a result of the mechanical linkage between the contact plate and the latching mechanism, a stored fuel bundle assembly cannot be removed from its fuel storage cell until after it has been lifted.

DETAILED DESCRIPTION OF THE PREFERRED EMBODIMENTS

Figure 1:
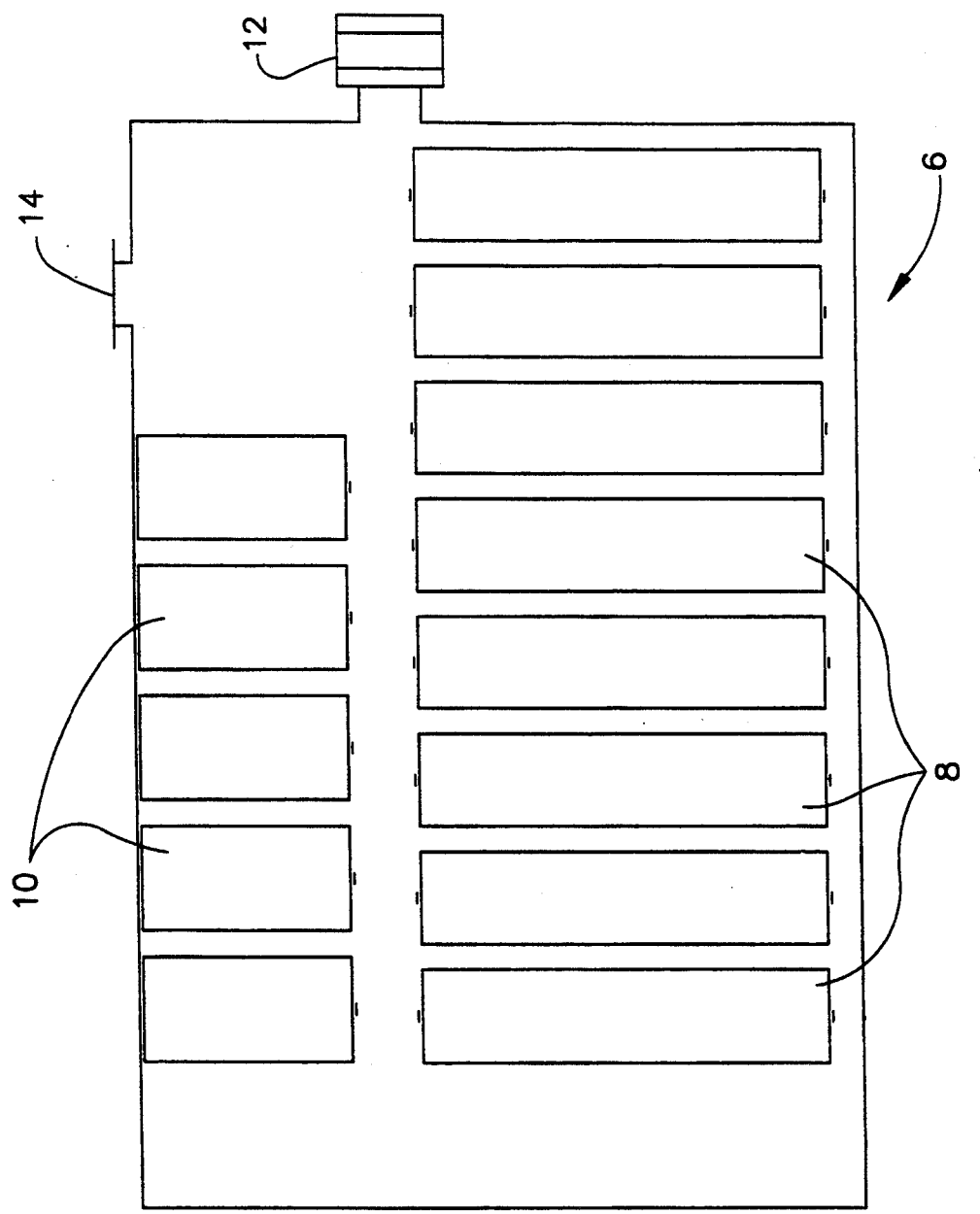
FIG. 1 is a floor plan showing the arrangement of storage racks in a new fuel storage pool in accordance with the invention.
Figure 1:
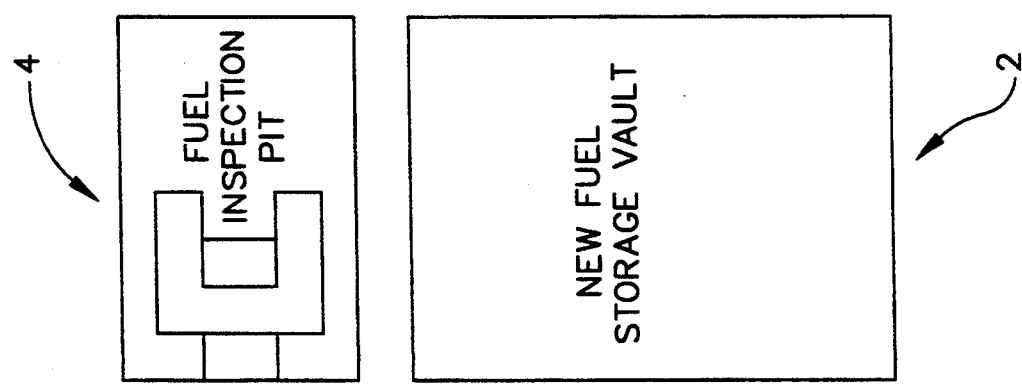

Prior to a refueling operation, new unchanneled fuel is stored in a new fuel storage vault 2 (see FIG. 1). When the time for refueling the reactor arrives, the new fuel is transferred to a fuel inspection pit 4, where the fuel is inspected and gauged. The transfer from the new fuel storage vault 2 to the fuel inspection pit 4 is performed by the auxiliary hoist on the fuel handling platform (not shown) or by the auxiliary hoist on the building crane (not shown).

When satisfactorily completed, the fuel bundles are channeled and then transferred from the fuel inspection pit 4 to a new fuel storage pool 6 using the auxiliary hoist on the building crane. In accordance with the invention, the new fuel storage pool is provided with rows of new fuel storage racks 8 and rows of control rod storage racks 10. The pool 6 is filled with water to a depth higher than the top of an upright fuel rod during transport.

A gate 12 is provided between the new fuel storage pool 6 and the reactor cavity (not shown). When gate 12 is opened, new fuel bundles can be transferred from new fuel storage pool 6 to the reactor cavity without lifting the new fuel bundle out of the water.

In addition, a gate 14 is provided between the new fuel storage pool 6 and the spent fuel transfer pool (not shown). During the refueling operation, the spent fuel bundles are transferred from the reactor cavity to the spent fuel transfer pool by way of open gate 12, pool 6 and open gate 14 in that order. As was the case for the new fuel bundles, each spent fuel bundle can be transferred to the spent fuel transfer pool without lifting the spent fuel bundle out of the water.

Figure 2:
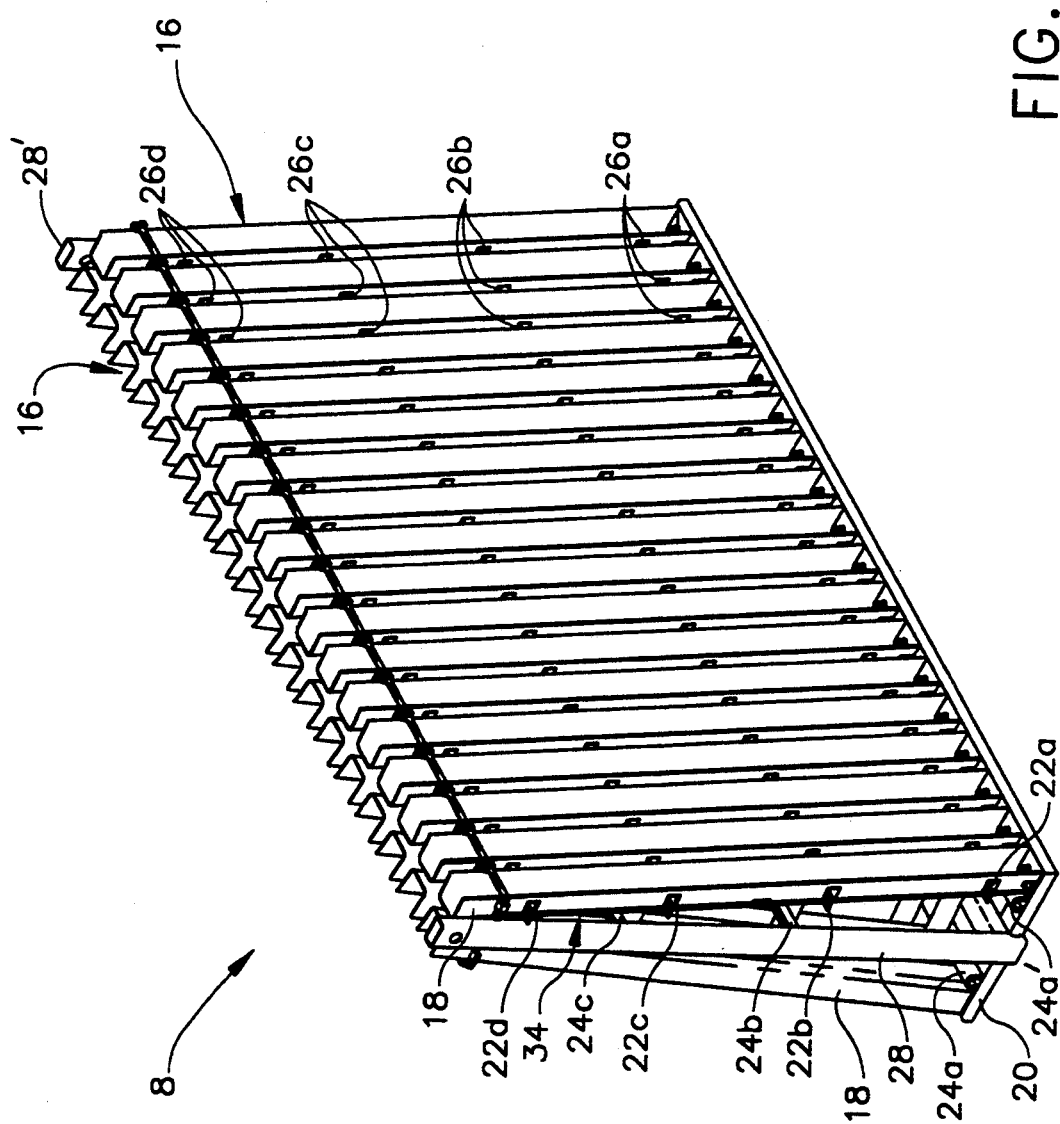
FIG. 2 is a perspective view of a fuel storage rack in accordance with a preferred embodiment of the invention.
Figure 3:
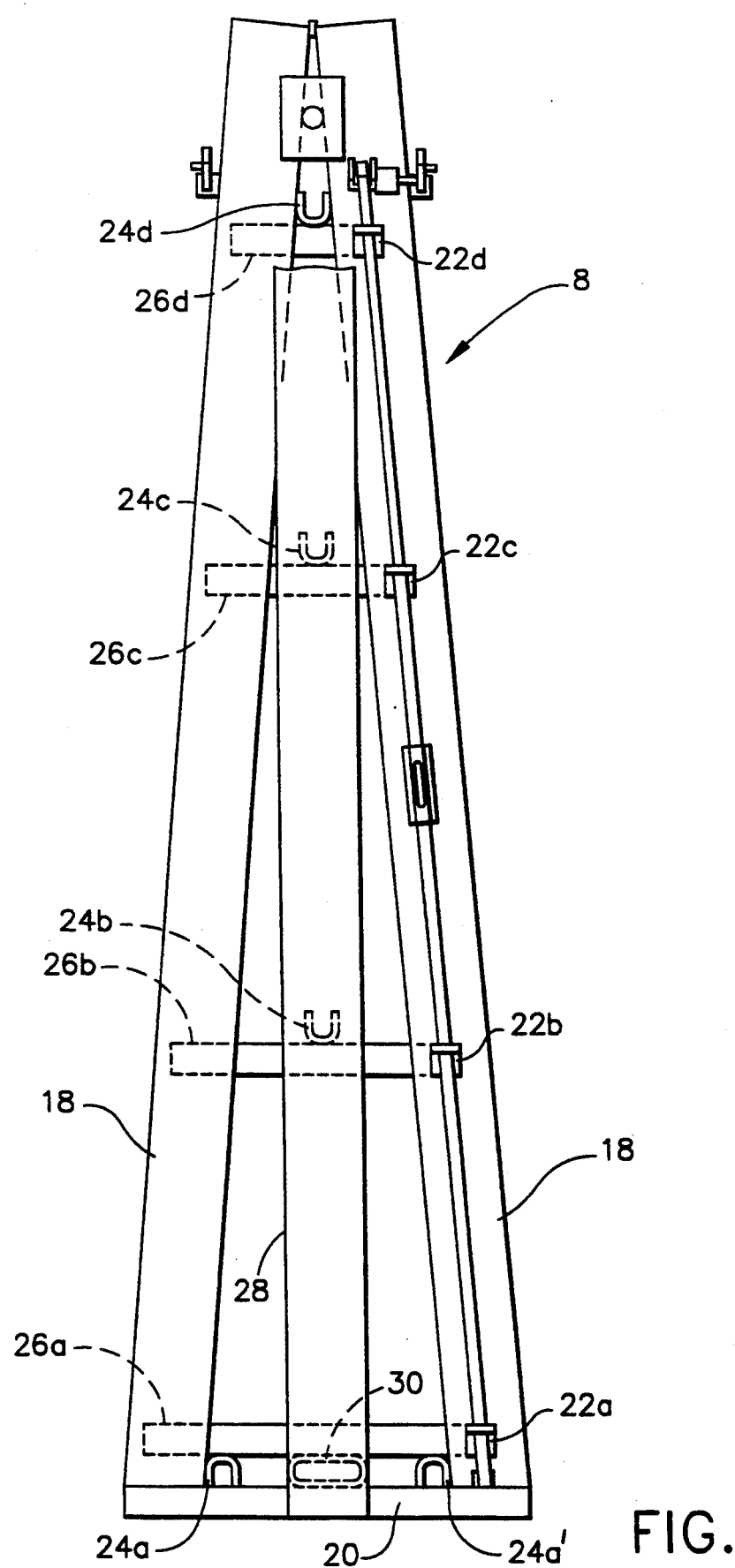
FIG. 3 is an end view of the fuel storage rack depicted in FIG. 2.

As shown in FIGS. 2 and 3, each new fuel storage rack 8 comprises a pair of rows of inclined fuel storage cells 16 arrayed back to back. Each fuel storage cell 16 comprises a storage channel 18 welded at a bottom end to a floor-mounted base 20 and welded on its sides at four different heights to four horizontal support racks (to be described in detail below). Each horizontal support rack is welded at opposing ends to vertical rack supports 28 and 28', which are in turn welded at their bottom ends to base 20.

Each of the three topmost horizontal support racks comprises a respective longitudinal support channel 24b, 24c and 24d welded at its ends to vertical support racks 28 and 28' and a plurality of transverse support channels 26b, 26c and 26d welded in the middle to a corresponding longitudinal support channel and welded at their ends to respective pairs of adjacent storage channels 18. The lowermost horizontal support rack comprises a longitudinal support tube 30 welded to vertical rack supports 28 and 28' and to base 20; a pair of longitudinal support channels 24a and 24a' welded to base 20; and a plurality of transverse support channels 26a welded to tube 30, channels 24a and 24a', and respective pairs of adjacent storage channels 18.

Each storage channel 18 is also welded at its bottom to one of support channels 24a and 24a', and at its top to support channel 24d. The result is a strong structure which rigidly supports the two rows of fuel storage channels 18 in an A-shaped configuration.

The top ends of vertical rack supports 28 and 28' have reinforced holes. Suitable hoisting equipment can be coupled to these reinforced holes to lift and transport the rack during installation.

The fuel storage cells 16 are welded in place at a small inclination, thus making the floor print larger than the area at the top. The fuel storage cells are also positioned so that all actuation rods 34 are on the left side as one faces the storage cells 16.

Figure 4:
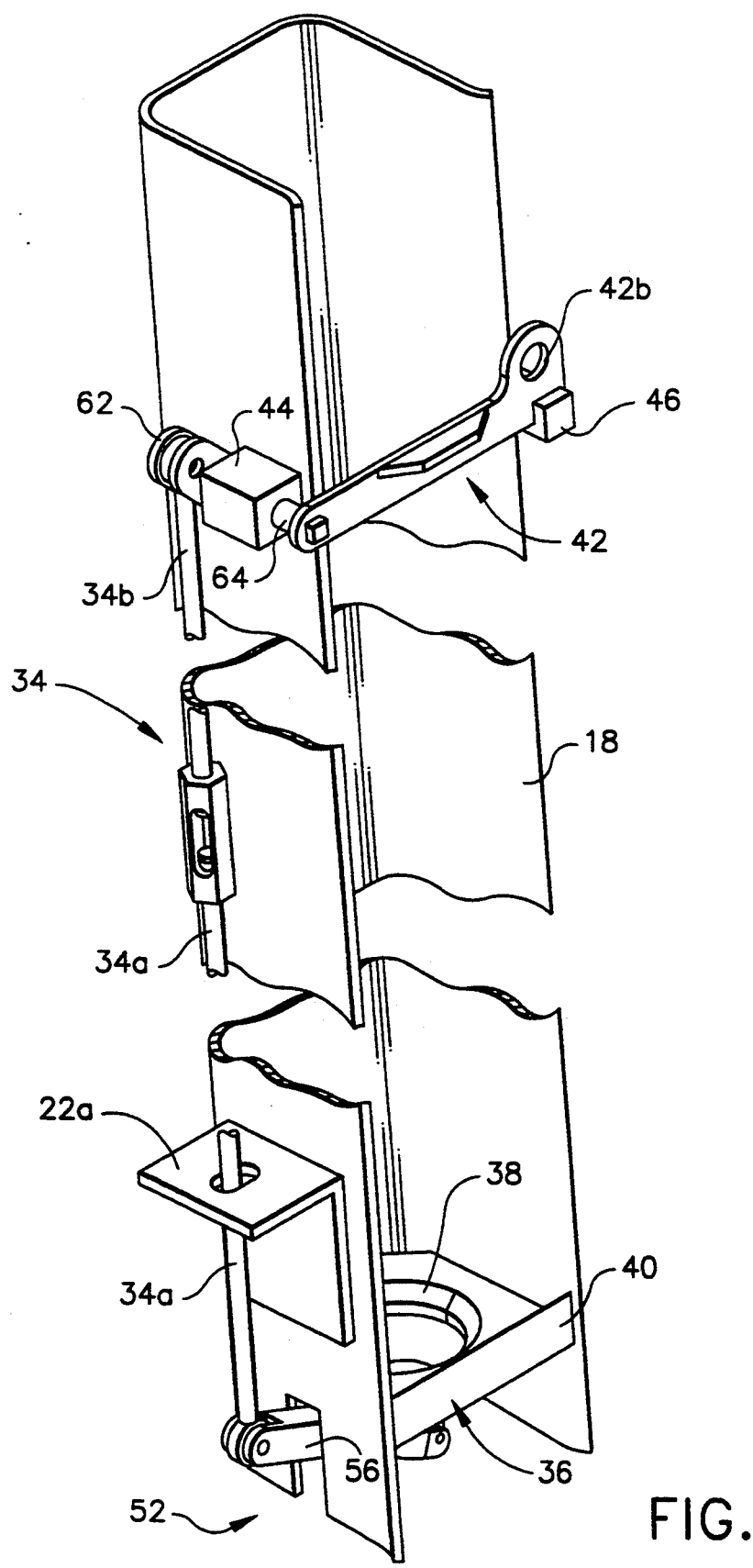
FIG. 4 is a perspective view of a fuel storage cell in accordance with the preferred embodiment of the invention.
Figure 6:
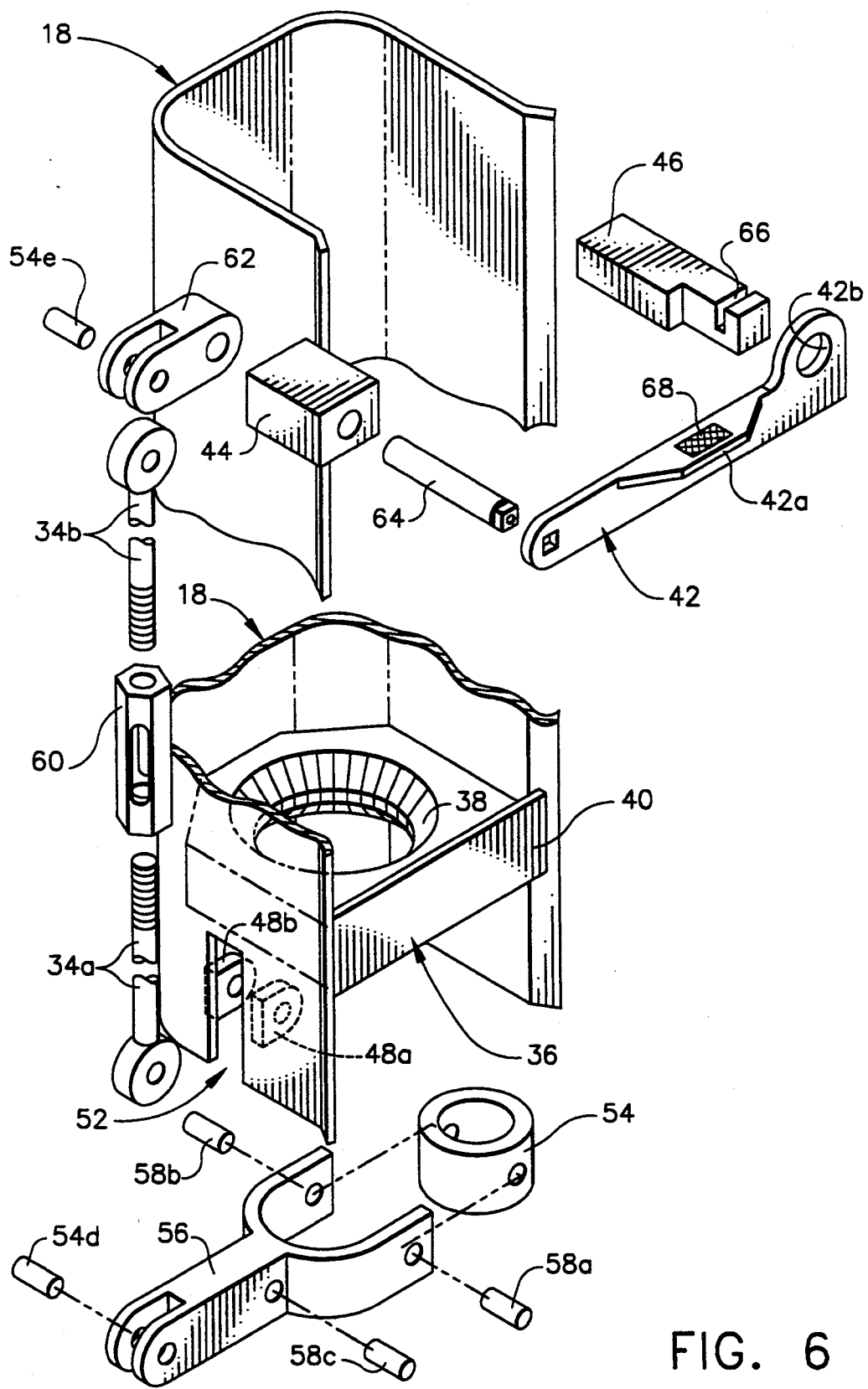
FIG. 6 is an exploded view of the key components of the mechanical linking assembly in accordance with the preferred embodiment of the invention.

Each fuel storage cell 16 comprises an aluminum storage channel 18 formed by bending ¼-inch stock. Referring to FIGS. 4 and 6, an aluminum support plate 36 is welded inside storage channel 18 near its bottom. Support plate 36 has a chamfered seating aperture 38 and a front lip 40.

Figure 5A:
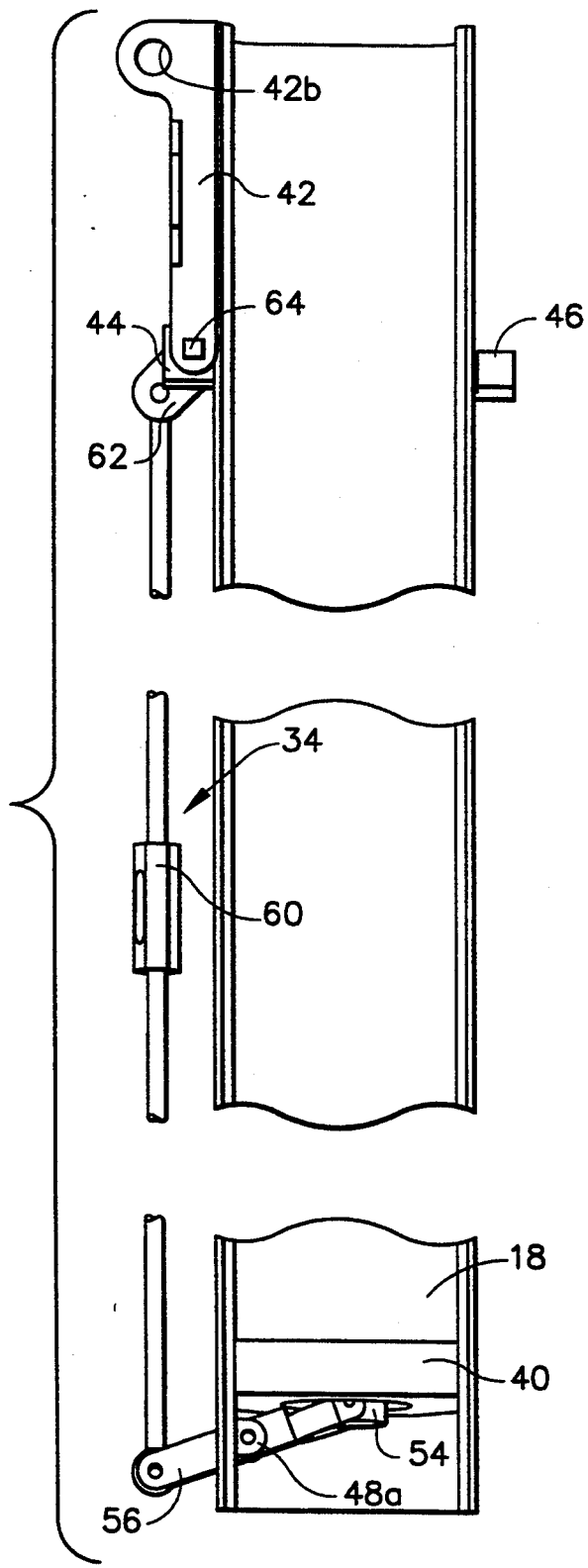
FIGS. 5A and 5B are front views of the fuel storage cell of FIG. 4 in the unlocked and locked states.

A latch 42 is mounted near the top of storage channel 18. Initially latch 42 must be in an open position, as shown in FIG. 5A. The hoist (not shown) is translated to move the fuel bundle assembly (not shown) hanging therefrom toward the open storage channel 18. After a bottom portion of the fuel bundle assembly bears against the back wall of the storage channel 18, continued translation of the hoist will cause the fuel bundle to incline until it is nested inside the inclined storage channel 18 at the same angle of inclination.

At this juncture, the hoist coupling is lowered, causing the fuel bundle to slide down the storage channel 18 until the bottom end of the fuel bundle is seated in seating aperture 38. Lip 40 retains the bottom of the fuel bundle inside the storage channel in the event that the fuel bundle is bowed.

A mechanical linking assembly is provided which causes latch 42 to close in response to proper seating of the stored fuel bundle. The mechanical linking assembly comprises a plurality of active linking elements supported by a plurality of passive support elements, which components will be described with reference to FIGS. 4, 5A, 5B and 6.

The passive support elements include the following: a latch block 44 welded to the outside upper left side of storage channel 18, a lock block 46 welded to the outside upper right side of storage channel 18, and a pair of lever blocks 48a and 48b (see FIG. 6) welded to the inside lower left side of storage channel 18; and four bent angles 22a, 22b, 22c and 22d (see FIG. 2) which are welded to the outer left side of the leftmost storage channel in a row at four different elevations. (For the other storage channels in a row, the transverse support channels 26a, 26b, 26c and 26d serve the same function as angles 22a, 22b, 22c and 22d.). Also a slot 52 is cut into the lower left side of each storage channel 18, extending upward from the bottom edge.

Referring to FIG. 6, the active linking elements will now be described. A contact plate 54 is pivotably coupled to two prongs of a Y-shaped lever 56 by a pair of pivot pins 58a and 58b. Contact plate 54 lies directly underneath the seating aperture 38 and may be cup-shaped for receiving the bottom end of the stored fuel bundle assembly which has passed through aperture 38. A pivot pin 58c mounted in lever blocks 48a and 48b acts as a pivot for lever 56, which fits through slot 52. As lever 56 rotates relative to blocks 48a and 48b, contact plate 54 rotates relative to lever 56 to maintain a constant orientation while in contact with the bottom end of the fuel bundle assembly.

Figure 5B:
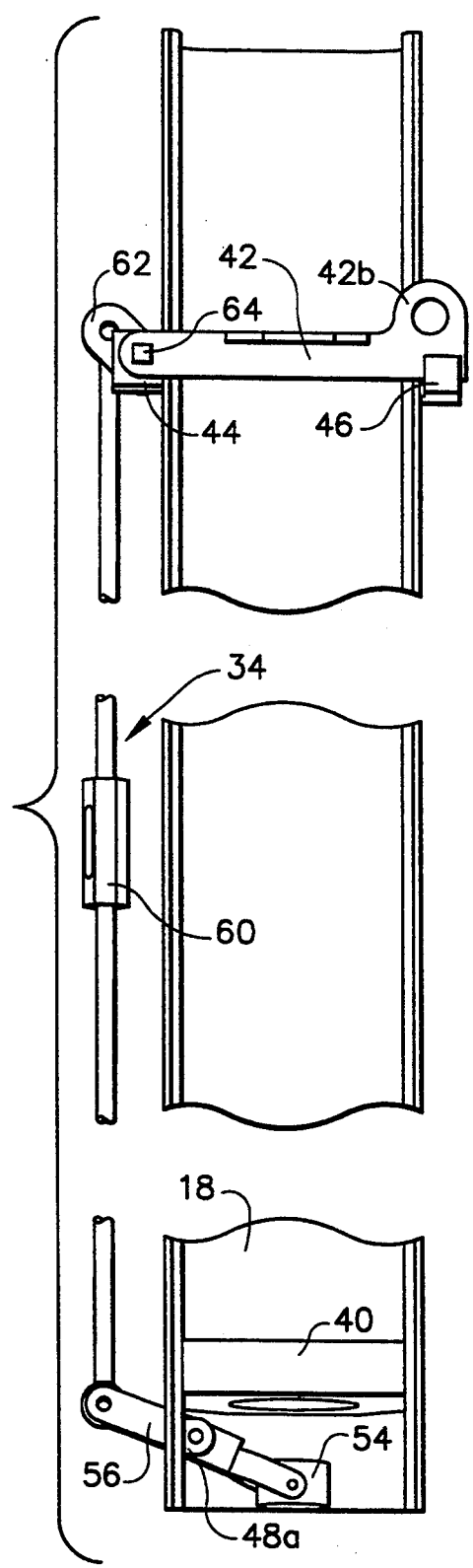

Actuation rod 34 consists of a lower actuation rod portion 34a rigidly connected to an upper actuation rod portion 34b by a turnbuckle 60. The lower end of lower actuation rod portion 34a is pivotably coupled to lever 56 by a pivot pin 54d. Lower actuation rod portion 34a slides through holes in angles 22a and 22b; upper actuation rod portion 34b slides through holes in angles 22c and 22d. As lever 56 rotates in a clockwise direction in response to depression of contact plate 54 as depicted in FIGS. 5A and 5B, actuation rod 34 rises.

The upper end of upper actuation rod portion 34b is pivotably coupled to one end of a latch clevis 62 by a pivot pin 54e. The other end of latch clevis 62 is rigidly connected to a latch shaft 64 which is pivotably supported by latch block 44. The other end of latch shaft 64 is rigidly connected to one end of latch 42. Thus, in response to elevation of actuation rod 34, latch 42 rotates through an angle of approximately 90 degrees from the unlocked position shown in FIG. 5A to the locked position shown in FIG. 5B.

In the locked position, the remote end of latch 42 sits in a slot 66 cut in lock block 46. The locked latch 42 prevents the stored fuel bundle assembly from falling out of storage channel 18 in the event of a seismic or other disturbance.

Latch 42 has a flag 42a (see FIG. 6) integrally connected thereto. Flag 42a has an area 68 on its top surface which may be coated with brightly colored epoxy paint. Area 68 is disposed so that it is easily visible from the refueling bridge above the new fuel storage pool when latch 42 is in the locked position. This facilitates periodic inspection to ensure that all new fuel is safely locked in the storage racks.

The actuation rod portions 34a and 34b and the turnbuckle 60 are made of stainless steel, whereas the latch 42, contact plate 54 and lever 56 are made of aluminum. The mechanical linking assembly is designed so that when a fuel bundle assembly nested in a fuel storage cell 16 is lifted, the weight of the stainless steel actuation rod causes the latch 42 to return to its open position. Latch 42 is further provided with a lifting eye 42b, which enables an operator to open the latch from the refueling bridge by means of a grapple hook (not shown) if any component of the mechanical linking assembly has failed.

The storage rack of the invention also has application in the storage of fuel control rods and other elongated objects. In such a case, the dimensions of the storage channel must be conformed to the dimensions of the object. Furthermore, variations and modifications of the mechanical linking assembly will be apparent to any skilled mechanical engineer. All such variations and modifications are intended to be encompassed by the claims set forth hereinafter.

I claim:

1. A storage cell for storing elongated objects, comprising:
   a straight storage channel having a substantially U-shaped cross section and having first and second side walls separated by an opening running otherwise along said channel, said opening having a width sufficient to allow passage of an elongated object therethrough;
   means for supporting said storage channel in an inclined position relative to a vertical plane;
   means for supporting said elongated object in said storage channel, said means being arranged at a bottom end of said storage channel; and
   means for blocking passage of said stored elongated object through said open front of said storage channel, said blocking means being movable from a non-blocking position to a blocking position in response to displacement of said elongated object from a first object position whereat said object supporting means does not support said object to a second object position whereat said object supporting means supports said object, said blocking means being mounted on said storage channel and comprising a rotatable latch which rotates between a first latch position whereat said latch blocks passage of said elongated object through said open side of said storage channel and a second latch position whereat said latch does not block passage of said elongated object through said open side of said storage channel, a rotatable lever which rotates in response to displacement of said elongated object from said first object position to said second object position, and a rigid actuation rod pivotably coupled to said lever and to said latch for causing rotation of said latch in response to rotation of said lever.

2. The storage cell as defined in claim 1, wherein said blocking means further comprises a contact plate with a concavity for receiving an end of said elongated object when said object is in said second object position, said contact plate being pivotably coupled to said lever.

3. The storage cell as defined in claim 1, wherein the weight distribution of said blocking means is such that said latch is rotated from said first latch position to said second latch position under the force of gravity alone in response to displacement of said elongated object from said second object position to said first object position.

4. The storage cell as defined in claim 3, wherein said actuation rod is made of stainless steel, and said storage channel, said latch and said lever are made of aluminum.

5. The storage cell as defined in claim 3, wherein said object supporting means comprises a support plate welded inside said storage channel, said support plate having a chamfered aperture for seating a seated portion of said elongated object, said aperture having a size which enables a lowermost portion of said elongated object to extend through said aperture when said seated portion of said object is seated thereon.

6. The storage cell as defined in claim 3, wherein said blocking means further comprises a slotted lock block welded to said storage channel, said lock block being positioned to receive said latch in said slot when said latch is in said first latch position.

7. A storage rack for storing elongated objects, comprising:
first and second rows of storage cells, each of said storage cells comprising a storage channel having an open side of width sufficient to allow passage of a elongated object therethrough, means for supporting said elongated object in said storage channel, and means for blocking passage of said stored elongated object through said open side of said storage channel in response to displacement of said elongated object from a first object position whereat said object supporting means does not support said object to a second object position whereat said object supporting means supports said object, said blocking means being mounted on said storage channel; and
means for supporting said first row of storage cells in a first inclined position and said second row of storage cells in a second inclined position, said first and second inclined positions forming an A-shaped configuration.

8. The storage rack as defined in claim 7, wherein said blocking means comprises a rotatable latch which rotates between a first latch position whereat said latch blocks passage of said elongated object through said open side of said storage channel and a second latch position whereat said latch does not block passage of said elongated object through said open side of said storage channel.

9. The storage rack as defined in claim 8, wherein said blocking means further comprises a rotatable lever which rotates in response to displacement of said elongated object from said first object position to said second object position, and a rigid actuation rod pivotably coupled to said lever and to said latch for causing rotation of said latch in response to rotation of said lever.

10. The storage rack as defined in claim 9, wherein said blocking means further comprises a contact plate with a concavity for receiving an end of said elongated object when said object is in said second object position, said contact plate being pivotably coupled to said lever.

11. The storage rack as defined in claim 9, wherein the weight distribution of said blocking means is such that said latch is rotated from said first latch position to said second latch position under the force of gravity alone in response to displacement of said elongated object from said second object position to said first object position.

12. The storage rack as defined in claim 11, wherein said actuation rod is made of stainless steel, and said storage channel, said latch and said lever are made of aluminum.

13. The storage rack as defined in claim 7, wherein said object supporting means comprises a support plate welded inside said storage channel, said support plate having a chamfered aperture for seating a seated portion of said elongated object, said aperture having a size which enables a lowermost portion of said elongated object to extend through said aperture when said seated portion of said object is seated thereon.

14. The storage rack as defined in claim 8, wherein said blocking means further comprises a slotted lock block welded to said channel, said lock block being positioned to receive said latch in said slot when said latch is in said first latch position.

15. A fuel storage pool for storing fuel bundle assemblies underwater, comprising a plurality of fuel storage racks separated by aisles, each of said racks having first and second rows of storage cells and means for supporting said first row of storage cells in a first inclined position and said second row of storage cells in a second inclined position, said first and second inclined positions forming an A-shaped configuration, wherein each of said storage cells comprises a storage channel having an open side of width sufficient to allow passage of a fuel bundle assembly therethrough, means for supporting said fuel bundle assembly in said storage channel, and means for blocking passage of said stored fuel bundle assembly through said open side of said storage channel in response to displacement of said fuel bundle assembly from a first position whereat said fuel bundle assembly supporting means does not support said fuel bundle assembly to a second position whereat said fuel bundle assembly supporting means supports said fuel bundle assembly, said blocking means being mounted on said storage channel and said open side of said storage channel facing one of said aisles.

16. The fuel storage pool as defined in claim 15 wherein said blocking means comprises a rotatable latch which rotates between a first latch position whereat said latch blocks passage of said fuel bundle assembly through said open side of said storage channel and a second latch position whereat said latch does not block passage of said fuel bundle assembly through said open side of said storage channel.

17. The fuel storage pool as defined in claim 16, wherein said blocking means further comprises a rotatable lever which rotates in response to displacement of said fuel bundle assembly from said first position to said second position, and a rigid actuation rod pivotably coupled to said lever and to said latch for causing rotation of said latch in response to rotation of said lever.

18. The fuel storage pool as defined in claim 16, wherein the weight distribution of said blocking means is such that said latch is rotated from said first latch position to said second latch position under the force of gravity alone in response to displacement of said fuel bundle assembly from said second position to said first position.

* * * * *